Nov. 14, 1944.  S. SALABES  2,362,501
CHUCK
Filed March 23, 1943
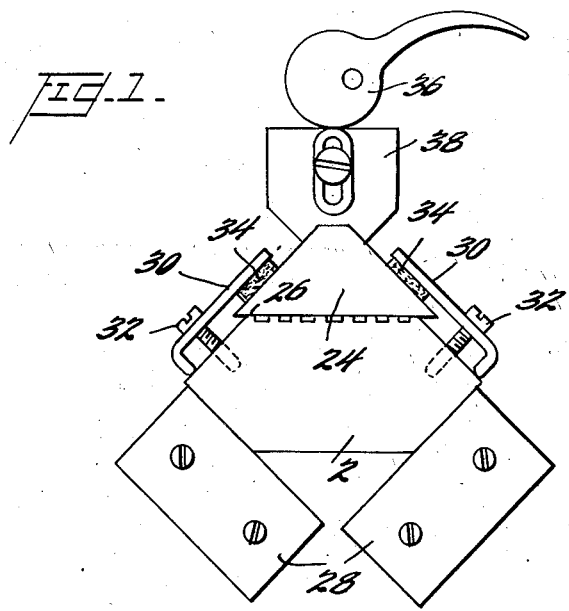
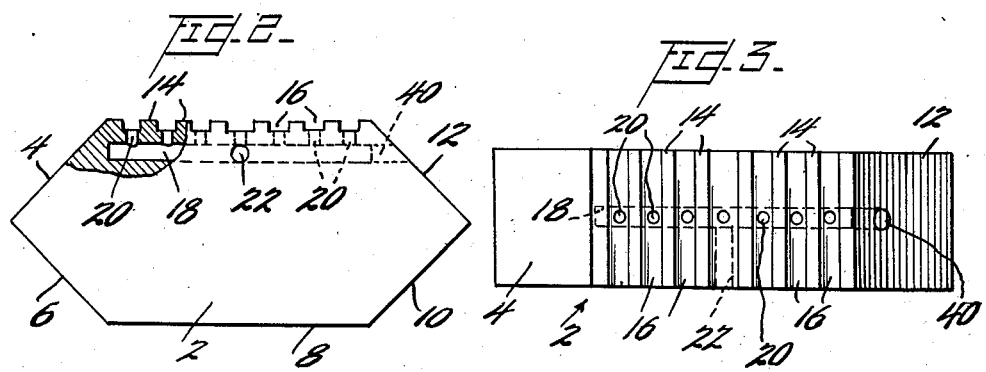
Inventor
Sody Salabes
By Chas. Silver
Attorney Patented Nov. 14, 1944

2,362,501

UNITED STATES PATENT OFFICE 2,362,501

CHUCK

Sody Salabes, Baltimore, Md., assignor to May Oil Burner Corporation, a corporation of Maryland Application March 23, 1943, Serial No. 480,229

2 Claims. (Cl. 51—216)

This invention relates to chucks and methods of securing objects thereto, and has particular reference to a novel type of holder for optical elements, such as prisms, and a novel method for supporting these optical elements so that the grinding and polishing operations thereon may be carried out efficiently and expeditiously.

In the methods and means heretofore employed for holding or blocking upon a chuck an object to be ground or polished, for example a prism, difficulties are encountered in the inaccurate placing and securing of the objects upon the chuck so that highly accurate grinding and finishing within the ranges of tolerance is difficult or practically impossible of accomplishment. In the case of prisms, when a finished surface is joined to the chuck, true contact between the entire face of the prism and the facing of the chuck rarely occurs. It has been found that the slightest deviation from true contact between the prism face and the chuck results in sufficient angular deviation from the true angle when the prism so mounted is ground, finished and polished to introduce errors beyond the range of tolerance.

Another disadvantage, incident to these chucks and the method of applying thereto the objects to be worked on, is the need for much reblocking when a plurality of faces are to be fashioned on the object.

Among the objects of this invention is the overcoming of the aforesaid disadvantages and objections by convenient, efficient and inexpensive method and means.

A further object of this invention is to secure the element to be ground and/or polished to the chuck so that there will be substantially perfect contact between the engaging surfaces in the same plane.

More specifically, it is an object of this invention to provide method and means for securely mounting or blocking prisms and other optical elements upon a chuck preliminary to grinding and/or polishing whereby a plurality of faces may be operated upon the optical element without the need for removing the optical element from the chuck and reblocking.

Other, further and more specific objects of this invention will become readily apparent to persons skilled in the art from a consideration of the following description when taken in conjunction with the accompanying drawing wherein:

Fig. 1 is an end view of an arrangement of chuck, prism blank and holder for blocking the prism blank upon the chuck.

Fig. 2 is a side view of my novel chuck, a portion being broken away to illustrate the interior construction thereof.

Fig. 3 is a top plan view of the chuck shown in Fig. 1.

A chuck 2 is formed with the faces 4, 6, 8, 10 and 12 in definite inclination to each other, the dihedral angles between the faces being determined by the geometric relation between the faces to be ground and polished on the prism. The other or top face of the chuck is formed with a plurality of relatively narrow ridges 14 which alternate with the undercut portions or channels 16. The top or outer faces of the ridges 14 are accurately and truly finished to lie in the same plane. The channels or grooves 16 communicate with the conduit 18 through the short passageways 20. An inlet 22 extends to the conduit 18.

The prism blank 24 is first ground to have a true plane surface 26, this surface being preferably the longest side. When this true plane surface 26 is placed upon the chuck 2, as shown in Fig. 1, there will be substantially perfect glass to metal contact between the prism and chuck. The chuck 2 rests in the stops 28. The prism is pressed against the chuck 2 by means of the arms 30 and set screws 32, the latter threading into the chuck 2. The rawhide liners or gaskets 34 protect the prism from damage by the arms 30. The final tightening of prism against chuck is effected by the cam lever 36 and head 38.

With the prism in this position, binding material such as molten wax, which hardens on cooling, is introduced through inlet 22, to channel 18 from where it is forced upwardly through the passageways 20 into the grooves 16 until these grooves are filled with the molten binding material. This binder is allowed to cool and harden. Owing to the narrow ridges and the resulting close glass to metal contact between prism and chuck, there will be no film of adhesive material between the contacting surfaces of these two elements, thus assuring substantially perfect blocking.

After the wax cools, the clamps may be removed and the prism and chuck can then be placed upon a suitable grinder and/or polisher for the finishing operations on the various faces of the prism. The chuck 2 is provided with suitable means (such as threaded bores not shown) whereby the chuck may be attached by any of the faces 4, 6, 8, 10 or 12 to the base of the grinding or finishing machine in order to grind or finish the various faces upon the prism. It will be seen that all this can be accomplished without reblocking the prism.

In forming the channel 18, the chuck may be drilled inwardly from one of the faces 12 after which the open end of the channel 18 is closed by the plug 40.

Fluid binders which harden or set, e. g. plaster of Paris, cellulose esters, casein adhesives, plastics and synthetic resins may be substituted, in whole or in part for the wax under various conditions, within the spirit and scope of this invention.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A chuck having a face for securing a flat-faced object thereto and in substantially perfect contact therewith, said face being in part undercut and in part raised to surface in the same plane, a conduit in said chuck in communication with said undercut part for supplying binding fluid upon said undercut part, and a plurality of other faces serving as guides for the grinding of objects secured to said chuck at definite respective angles to each guiding face.

2. A chuck having a face comprising alternate grooves and ridges, the tops of said ridges being flat and in the same plane, a conduit in said chuck in communication with said channels for supplying binding fluid thereto, and a plurality of other faces serving as guides for the grinding of objects secured to said chuck at definite respective angles to each guiding face.

SODY SALABES.